L. OTTINGER.
FASTENING DEVICE.
APPLICATION FILED JULY 19, 1921.
Reissued July 18, 1922.
15,412.
2 SHEETS—SHEET 1.
Fig. 1
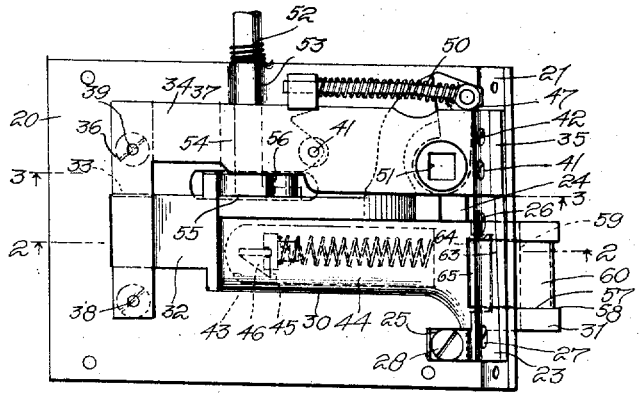
Fig. 2
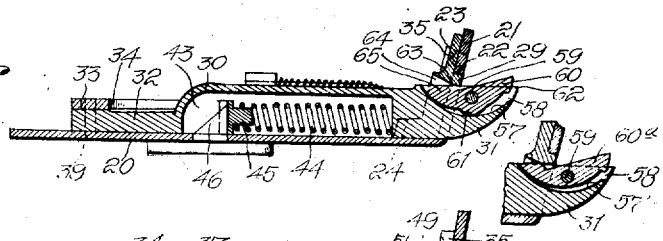
Fig. 2a
Fig. 3
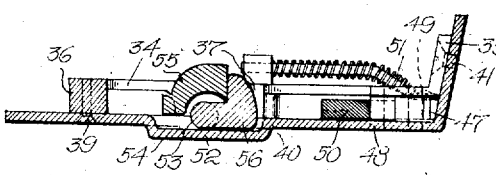
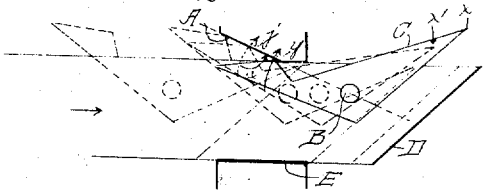
Fig. 4
INVENTOR
Leon Ottinger.
BY C. P. Goepel
ATTORNEY

L. OTTINGER.

FASTENING DEVICE.

APPLICATION FILED JULY 19, 1921.

Reissued July 18, 1922.

15,412

2 SHEETS—SHEET 2.

INVENTOR

Leon Ottinger.

BY C. P. Gepel

ATTORNEY

UNITED STATES PATENT OFFICE.

LEON OTTINGER, OF NEW YORK, N. Y.

FASTENING DEVICE.

15,412. Specification of Reissued Letters Patent. Reissued July 18, 1922.

Original No. 1,312,199, dated August 5, 1919, Serial No. 226,411, filed April 3, 1918. Application for reissue filed July 19, 1921. Serial No. 485,991.

*To all whom it may concern:*

Be it known that I, LEON OTTINGER, a citizen of the United States, and resident of the borough of Manhattan, in the city, county, and State of New York, have invented certain new and useful Improvements in Fastening Devices, of which the following is a specification.

The present invention relates to fastening devices, and particularly locks or latches. While I have illustrated my invention with reference to an automobile door latch, in which the present invention meets the peculiar conditions of service found only in such locks, it will be understood that the invention is adapted to other uses, such for instance as refrigerator doors and doors generally, and the new mechanical principle involved will find use in any structure requiring a secure fastening, and particularly that class of uses at present supplied by the so-called expansion bolts.

With the old types of locks other than that disclosed in my United States Patents No. 1,203,394 of October 31st, 1916, and Nos. 1,192,448 and 1,192,449 of July 25th, 1916, many disadvantages were present, and it was practically impossible to produce a perfect fitting door, which would not rattle and which would maintain its fit for any great length of time. In doors of buildings, this question of tight fitting of the doors to prevent rattling has been entirely overlooked, principally as the degree of annoyance was not as great as in doors of automobiles or refrigerator doors, where it is essential that a very tight fit be provided. Refrigerator doors have been for the most part locked by a cam lever, which is hard to operate and becomes worn very rapidly, and no provision is made for changes in the door produced by atmospheric conditions.

In automobile doors, rubber stops are placed upon the door stop to take up any looseness. These exert a pressure upon the door when closed very much greater than the pressure of the lock spring, that is for example, 250 pounds as against 15 pounds. The theory of this method is to depend upon the force with which the door is slammed to obtain the pressure. This action springs, twists or warps the door into place, and it displaces the rubber between it and the jamb and causes an elastic rebound pressure which is then maintained by the latch bolt entering behind the striker plate at the moment of the slamming impact. This method can prevent rattling only temporarily on account of the deterioration of the rubber necessitating frequent renewals of the rubber, and the fact that sooner or later a door will become bent and strained on account of the constant slamming, twisting and bending of the doors. Although the door is difficult to open by hand, because of the rebound pressure and the pressure behind the latch, yet when an automobile is in motion, these pressures work against each other, the greater rebound pressure causing the latch to gradually move back, frequently causing the door to open of its own accord. This also causes looseness in the handle mechanism, so that the handles rattle and are not maintained in their proper normal position.

I propose in the present invention to obviate these disadvantages, and to provide a lock which will take up any looseness between the door and door jamb, whether the looseness be slight or great, and will rigidly support the door against pressure at either side. At the same time, the door may be closed without slamming, and opened with ease, it being unnecessary to overcome any rebound pressure or friction produced by sliding of the latch bolt. Wear upon the lock is reduced to a negligible quantity, and this is automatically taken up without impairing its efficiency, and the use of rubber or other such substance subject to change is eliminated, so that there is practically no deterioration due to use.

A further object is to provide means for preventing looseness of the handles, and maintaining them in their proper position when the latch bolt is not fully projected.

With these and other objects in view, embodiments of my invention are shown in the accompanying drawings, and these embodiments will be hereinafter more fully described with reference thereto, and the invention will be finally pointed out in the claims.

In the accompanying drawings:

Figure 1 is a plan view of a latch embodying my invention;

Figure 2 is a longitudinal sectional view taken along the line 2—2 of Figure 1;

Figure 9:
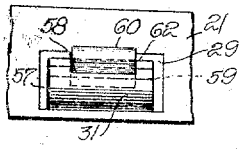
Figure 10:
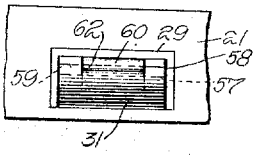
Figure 11:
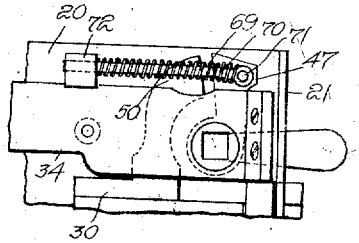
Figure 12:
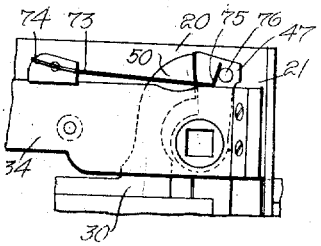

Figure 2ª is a sectional fragmentary view of a slightly modified form;

Figure 3 is a similar view taken along the line 3—3 of Figure 1;

Figure 4 is a diagrammatic illustration of a mechanical movement employed;

Figs. 5, 6, 7 and 8 are sectional views showing the latch in four positions of movement with respect to the latch engaging portion of the door jamb;

Figs. 9 and 10 are front end views of the latch showing the latching member in retracted and projected positions respectively;

Fig. 11 is a detail plan view with parts broken away showing the action of the handle retaining means;

Figure 12 shows a modified form of handle retaining means; and

Figure 13:
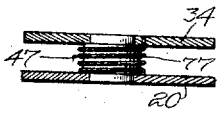

Figure 13 is a sectional view showing a further modified form.

Similar reference characters indicate corresponding parts throughout the several figures of the drawings.

Referring to the drawings, and more particularly to Figs. 1 to 3 thereof, the supporting plate 20 is provided at its front end with a face portion 21 bent upwardly, and inclined outwardly therefrom. A rectangular opening 22 is provided in the face 21, and at the inner side of the said face there is secured a latch bearing 23 of inverted U-shape, base portions 24 and 25 resting upon the plate 20, the bearing being secured in place by screws 26, 27 and 28. A flange 29 extends into the opening 22 engaging the upper and side edges thereof.

The latch bolt 30 is provided at its forward end with a nose 31 which engages the bearing 23 and is adapted to be projected and retracted with respect thereto, and at its rear end a guide extension 32 is provided, adapted to be reciprocated in a guide passage 33 of the frame 34. The frame 34 is provided at its forward end with an upturned portion 35 engaging the face 21, and with the exception of the portions 36 and 37 which rest upon the plate 20 and are secured thereto by screws 38, 39 and 40, is spaced from the said plate 20. The portion 35 is secured to the face 21 by screws 41 and 42. A longitudinal recess 43 is provided in the under side of the latch bolt, and a spring 44 is disposed therein, engaging at one end the front wall of the recess, and at its other end secured to a stud 45, mounted upon a lug 46 struck up from the plate 20. The spring 44 constantly exerts a projecting force upon the latch bolt.

Retraction of the bolt may be brought about either by the lever 47 rotatably mounted in openings 48 and 49 of the plate 20 and frame 34, engaging a projection 50 of the latch bolt, and operable through a handle secured in the square opening 51, or by rotation of the upright shaft 52 mounted in semicircular sockets 53 and 54 provided respectively on the plate 20 and the portion 37 of the frame 34, engaging a projection 55 of the bolt by means of a lateral cam portion 56.

In the upper flat side of the nose portion 31 of the latch bolt, there is provided a recess 57, open as at 58 at its forward end. Within the recess there is rotatably mounted upon a transverse pin 59 a rocker member 60. Beneath the pin 59 there is provided on the underside of the rocker a bolster portion 61 which slidably engages the bottom of the recess, forming a support for the rocker, supplementing the pin against lateral pressure. If desired, this portion 61 may be entirely eliminated, and a rocker member 60ª such as shown in Fig. 2ª provided.

In the projected position of the latch, the pin is disposed forwardly of the face 21 of the supporting plate, while in the retracted position it moves rearwardly of the plate, and the upper flat surface of the rocker becomes flush with the upper flat surface of the nose, a projecting portion 62 at the forward end of the rocker, engaging and filling in the open portion 58, so that the rounded under side of the nose presents a smooth and solid surface. The flat surface 63 of the latch bearing 23 swings the rocker into this position as the axis of the pin passes beneath the front edge thereof.

An upwardly inclined cam and abutment surface 64 extends rearwardly of the flat surface 63, this surface being slightly wider than the rocker as clearly indicated in Fig. 1. At the inner end of the rocker there is provided a raised cam portion 65, adapted to engage the surface 64 during the projection of the latch to project the forward end of the rocker laterally of the latch. The contact point of the portion 65 is rounded and is nearer to the axis of rotation of the rocker than the forward end thereof, so that there is a proportionately greater movement of the said forward end. In any position of contact with the surface 64 the rocker is rigidly locked against return movement without initial retraction movement of the latch bolt, and repression of the latch bolt is prevented by a force exerted directly on the rocker, as for instance such a force as would result from leaning heavily upon the door to which the latch is attached.

In Fig. 4 I have illustrated diagrammatically and somewhat enlarged the new principle involved. The inclined cam and abutment surface A is in a plane passing through the axis of the pivot B of the rocker C, which is carried by the member D, in the fully projected position of the member D, or it may be in a plane passing in front of the axis of the pivot B. Thus a force exerted laterally of the member D upon the rocker is applied against the surface A along the line $y$ in a perpendicular direction to the said surface, or in the case of the plane passing in front of the axis as when the member D is not fully projected, the lines of force are in the direction of the arrows $x'$, $y'$, the line $y'$ forming an obtuse angle indicated at $a$ with the surface A. The rocker is thereby absolutely locked against movement without initial retraction of the member D. In the fully retracted position and prior to engagement with the surface A the forward end of the rocker is depressed flush with the surface of the member D. This new mechanical movement will find application in numerous other uses, such as expansion attachment means, capable of ready disengagement, so that I do not desire to limit myself to its particular use in latches as disclosed.

Figure 5:
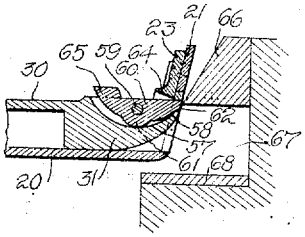
Figure 6:
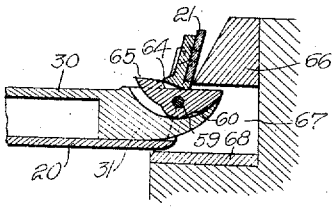
Figure 7:
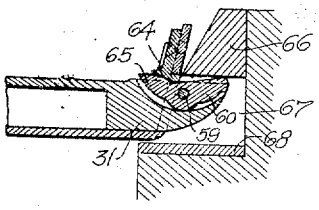
Figure 8:
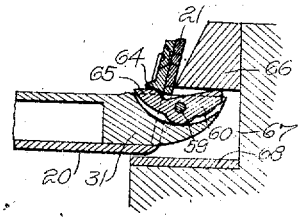

The operation of the latch is illustrated in Figs. 5 to 8, Fig 5 illustrating the retracted position of the bolt. This retraction is brought about through operation of the handle, and is assisted by engagement of the rounded surface of the belt with the striker plate 66 of the door jamb. When the bolt is released by the striker plate it is projected into the rabbet 67 behind the striker, moving for a considerable distance without frictional contact with the striker. (Fig. 6). In the continued projection of the latch plate under the action of the spring 44, the cam portion 65 of the rocker rides over the inclined surface 64, thus oscillating said rocker and projecting the other end thereof beyond the open side of the recess 57 and into bearing contact with the striker 66. Pressure of this end of the rocker against the face of the striker operates to expand the latch plate in its transverse dimension during the latter portion of its projection and thereby forces the free edge of the door at its outer side tightly against the stop plate 68, thereby taking up any play which would otherwise occur between the door and the stop plate, or the projecting end of the latch plate and the striker (Fig. 8). The door is thus held absolutely tight in its closed position and noisy rattling of the end of the latch plate against the striker is prevented.

In practice the bolt is never fully projected, and any wear upon the same is automatically taken up. This wear is negligible however, as there is very little friction contact, and the striking force of the rocker against the striker is considerably less than the actual force of the spring, because of the lateral divergence of the same. The door may be opened with great ease, it being only necessary to overcome the pressure of the spring 44, the rocker being disengaged from the striker as soon as the retraction movement commences. Danger of the door opening because of widely different pressures working against each other as in the old types of latches, is entirely eliminated.

In order to prevent rattling of the handles, and prevent any looseness therein when the bolt is not fully projected, I provide spring means cooperating with the lever arm 47 to hold the same yieldingly in engagement with the inclined face 21.

In Figs. 11 to 13, I have shown several forms of springs which may be employed for this purpose, the first, a helical spring 69 disposed upon a shaft or guide rod 70, pivoted at one end 71 to the lever, and slidable at its other end through the bracket 72 formed on the frame 34. In Fig. 12, I have shown a leaf spring 73 secured at one end to the bracket 74, and at its other turned up end 75 engaging a pin 76 of the lever. Fig. 13 illustrates a spiral form of spring 77, disposed in the lever and having its ends secured respectively to the frame 34 and the lever.

I have illustrated preferred and satisfactory embodiments of my invention, but it is obvious that changes may be made therein within the spirit and scope thereof, as defined in the appended claims.

I claim:

1. In a latch, a latching member adapted to be projected and retracted, a strike, and means adapted to expand the latching member in its transverse dimension during projection including a part carried by the latching member and co-acting with the strike, and means cooperating with said part to move the same into operative engagement with the strike and preventing return movement of said part to its normal position and permitting of such return movement only upon a retraction movement initially applied to said latching member.

2. In a latch, a latching member adapted to be projected and retracted longitudinally of its axis, means for expanding the latching member transversely of its axis during projection of said member and means co-acting with a part of said last named means to maintain the effectiveness of the latter and hold the latching member under expansion while permitting of the release of the expanding means upon a retraction movement initially applied to the latching member.

3. In a latch, a latching member adapted to be projected and retracted, and means adapted to expand said member in its transverse direction during projection thereof, said means including a part movable with the latching member and also independently thereof and cam means adapted to coact with said part during projection of the latching member to effect the expansion of the latter and maintain the same under expansion until a retraction movement is initially applied to said latching member.

4. In a latch, a latching member adapted to be projected and retracted, latching member carried means adapted to expand the same in its transverse dimension during projection, and means cooperating with said latching member carried means, and adapted to prevent return movement of said latching member carried means, said latching member carried means adapted to be returned only by retraction movement initially applied to said latching member.

5. In a latch, a latching member adapted to be projected and retracted longitudinally of its axis, latching member carried means adapted to expand the same transversely of its axis, and means cooperating with said latching member carried means, and adapted to prevent return movement of said latching member carried means, said latching member carried means adapted to be returned only by retraction movement initially applied to said latching member.

6. In a latch, a latching member adapted to be projected and retracted, latching member carried means adapted to expand the same in its transverse dimension, inclined cam and abutment means adapted to engage said latching member carried means during projection of said latching member to move the same into expanding position, and adapted to prevent return movement of said latching member carried means, said latching member carried means adapted to be returned only by retraction movement initially applied to said latching member.

7. In a latch, a latching member adapted to be projected and retracted, latching member carried means adapted to expand the same in its transverse dimension, inclined cam and abutment means adapted to engage said latching member carried means during projection of said latching member to move the same into expanding position, and adapted to prevent return movement of said latching member carried means, said latching member carried means adapted to be returned only by retraction movement initially applied to said latching member, the degree of expansion being variable with the amount of projection of said latching member.

8. In a latch, a latching member adapted to be projected and retracted longitudinally of its axis, pivoted latching member carried means adapted to expand the same transversely of its axis, and means cooperating with said latching member carried means, and adapted to prevent return movement of said latching member carried means, said latching member carried means adapted to be returned only by retraction movement initially applied to said latching member.

9. In a latch, a frame provided with a guide passage, a latching member having a nose adapted to be projected and retracted through said passage, a rocker member carried by said nose and adapted to expand the same in its transverse dimension by projection therefrom, and means adapted to engage said rocker during projection of said latching member to project the same relatively to said latching member, said means adapted to prevent return movement of said rocker, said rocker adapted to be returned only by retraction movement initially applied to said latching member.

10. In a latch, a frame provided with a guide passage, a latching member having a nose adapted to be projected and retracted through said passage, a rocker member carried by said nose pivoted intermediate its ends, and adapted to expand the same in its transverse dimension by projection from said latch member of one end thereof, and an inclined cam and abutment surface in said passage adapted to engage the other end to project said first mentioned end relatively to said latching member, said surface adapted to prevent return movement of said rocker, said rocker adapted to be returned only by retraction movement initially applied to said latching member.

11. In a latch, a frame provided with a guide passage, a latching member having a nose adapted to be projected and retracted through said passage, a rocker member carried by said nose pivoted intermediate its ends, and adapted to expand the same in its transverse dimension by projection of one end thereof from said latch member, and an inclined cam and abutment surface in said passage adapted to engage the other end to project said first mentioned end relatively to said latching member, said surface adapted to prevent return movement of said rocker, said rocker adapted to be returned only by retraction movement initially applied to said latching member, said cam and abutment surface being in a plane passing through the pivotal axis of said rocker in the fully projected position of said latch member.

12. In a latch, a frame provided with a guide passage, a latching member having a nose adapted to be projected and retracted through said passage, latching member carried means adapted to expand the nose in its transverse dimension, said nose adapted to move without expansion during the initial part of its projection movement, and means cooperating with said latching member carried means adapted to project the same relatively to said latching member during the remaining projecting movement, said means adapted to prevent return movement of said latching member carried means, said latching member carried means adapted to be returned only by retraction movement initially applied to said latching member.

13. In a latch, a frame provided with a guide passage, a latching member having a recessed nose adapted to be projected and retracted through said passage, a rocker member pivotally mounted in said recess, and independently and slidably supported in said recess beneath said pivot, said rocker member adapted to expand said latching member in its transverse dimension by projection therefrom, and means adapted to engage said rocker during projection of said latching member to project the same relatively to said latching member.

14. In a latch, a latching member, a movable part carried thereon, means for projecting said latching member, means for retracting said latching member, a latch engaging member, means for forcing said part laterally, said latching member being limited in its projecting movement by said part contacting with said latch-engaging member under pressure of said projecting means when latched, said means for forcing said part laterally adapted to prevent return movement of said part, said part adapted to be returned only by retraction movement initially applied to said latching member.

15. In a latch, a latching member, a movable part carried thereby, means for projecting said latching member, means for retracting said latching member, a latch engaging member, means for forcing said part laterally, said latching member being limited in its projecting movement by said part contacting said latch engaging member normally preventing full projection of said latching member, said latching member adapted to retain said retracting means in normal position in the fully projecting position of said latching member, a guide rod connected to said retracting means, a compression coil spring disposed thereon and adapted to be compressed upon operation of said retraction means and expanded upon release of said retraction means, to retain said retraction member in normal position independently of said latching member when said latching member is not fully projected.

16. In a latch, a latching member, a movable part carried thereby, means for projecting said latching member, means for retracting said latching member, a latch engaging member, means for forcing said part laterally, said latching member being limited in its projecting movement by said part contacting with said latch engaging member under pressure of said projecting means when latched, said means for forcing said part laterally adapted to prevent return movement of said part, said part adapted to be returned only by retraction movement initially applied to said latching member, said latch engaging member normally preventing full projection of said latching member, said latching member adapted to retain said retracting means in normal position in the fully projected position of said latching member, and yielding means for independently retaining said retracting means in normal position when said latching member is not fully projected.

17. A mechanical movement comprising a support, a member adapted to be projected and retracted relatively to said support, means on said member adapted to expand said member in its transverse dimension by projection therefrom, means adapted to engage said means carried by said member during projection of said member to project the same relatively thereto, and adapted to prevent return movement of said means carried by said member, said means carried by said member adapted to be returned only by retraction movement initially applied to said member.

18. A mechanical movement comprising a support, a member adapted to be projected and retracted relatively to said support, a rocker on said member pivoted intermediate its ends and adapted to expand the transverse dimension of said member by projection of its outer end therefrom, an inclined cam and abutment surface adapted to engage the inner end of said rocker during projection of said member to project the same relatively thereto, said surface adapted to prevent return movement of said rocker, said rocker adapted to be returned only by retraction movement initially applied to said member, the pivotal axis of said rocker in the fully projected position of said member being within an angle formed by the plane of said inclined surface and a plane parallel to the direction of movement of said member and passing through said pivotal axis.

19. In a latch, a latching member adapted to be projected and retracted, latching member carried means adapted to expand the same in its transverse dimension, means adapted to be engaged by said latching member carried means, and adapted during engagement to expand the same, and constituting during engagement an abutment against complete return movement of said latching member carried means, by a force exerted directly thereon.

20. In a door latch, a latch engaging member, latch means carried by the door including a pivotally mounted rocker, means for actuating said latch means to project and retract said rocker, said rocker in its projected position coacting with said member when the door is closed to prevent the retraction movement of said latch means by a force other than that incident to the operation of said actuating means.

21. In a latch, a latching member, means for projecting said latching member, means for retracting said latching member, a stop, a latch engaging member, said latching member being normally fully projected when not engaged with said latch engaging member, means acting between said latch engaging member and said latching member for forcing the latter yieldingly toward said stop when the parts are latched and acting when the parts are latched to prevent repression of said latching member by a force exerted directly on said means, said means adapted to prevent full projection of said latching member when engaged with said latch engaging member, said latching member adapted to retain said retracting means in normal position in the fully projected position of said latching member, and yielding means for independently retaining said retracting means in normal position when said latching member is engaged with said latch engaging member and not fully projected.

22. In a latch having a latching member adapted to be projected and retracted, an opposed latch engaging member, and a stop, means acting between said latch engaging member and said latching member for forcing the latter yieldingly toward said stop when the parts are latched and acting when the parts are latched to prevent repression of said latching member by a force exerted directly on said means.

23. In a latch having a latching member adapted to be projected and retracted, an opposed latch engaging member, and a stop, pivoted means acting between said latch engaging member and said latching member for forcing the latter yieldingly toward said stop when the parts are latched to prevent repression of said latching member by a force exerted directly on said pivoted means.

24. In a latch, the combination of a latching member adapted to be projected and retracted, an opposed latch engaging member, a stop, and means acting between said latch engaging member and said latching member for forcing the latter yieldingly toward said stop when the parts are latched to prevent repression of said latching member by a force exerted directly on said means in a direction transverse to the retraction movement of said latching member, said means adapted to be made non-operative by retraction of said latching member.

25. In a latch, a rectilinearly movable latching member, means normally acting to project said latching member, means for retracting said latching member, said latching member coacting with a part of the retracting means to retain the latter in normal position when the latching member is fully projected, a rod pivotally connected to said part of the retracting means, a fixed guide through which the rod is loosely movable and an expansion spring engaged upon said rod and bearing at one of its ends against the guide to independently retain the retracting means in normal position when the latching member is not fully projected.

In testimony that I claim the foregoing as my invention, I have signed my name hereunder.

LEON OTTINGER.